Figure 1:
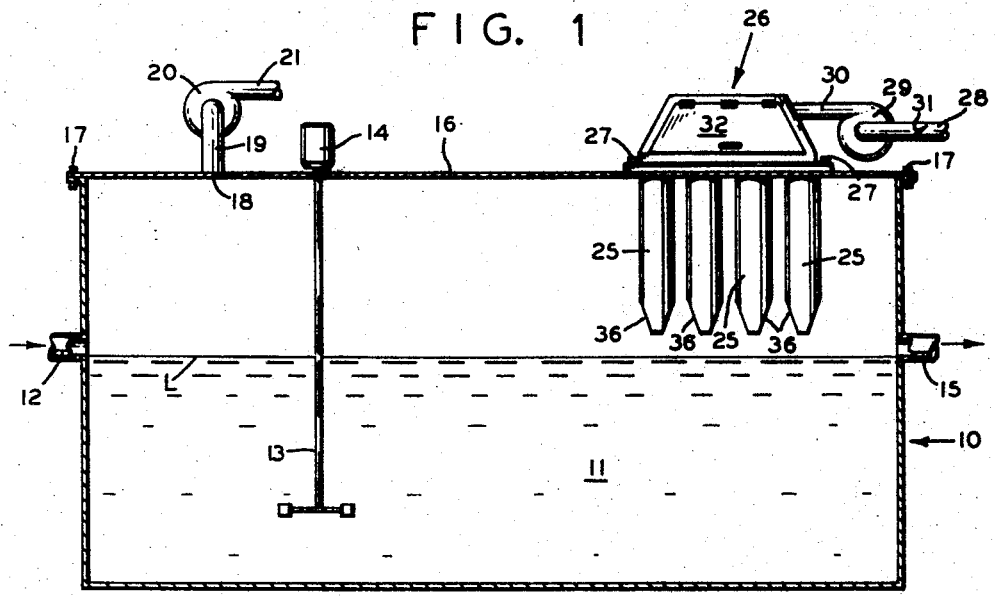

INVENTOR.
WILLIAM A. LUTZ

United States Patent Office 3,148,948
Patented Sept. 15, 1964

3,148,948
COOLING AND DEFOAMING PHOSPHORIC ACID SLURRIES
William A. Lutz, Weston, Conn., assignor to Dorr-Oliver Incorporated, Stamford, Conn., a corporation of Delaware
Filed Dec. 26, 1961, Ser. No. 161,913
3 Claims. (Cl. 23—165)

The present invention relates to the treatment of solutions or slurries, and more particularly to an improved process and apparatus for cooling and defoaming a reaction slurry by blowing streams of air at relatively high velocities on to the slurry surface.

While this invention is applicable to the treatment of solutions and slurries in general it will be described, by way of example, in connection with the manufacture of phosphoric acid by the wet process method to which this invention finds particular utility.

In the manufacture of phosphoric acid by the wet process method finely ground phosphate rock is reacted with acid, such as sulfuric acid to form phosphoric acid and calcium sulfate. During this reaction a considerable amount of reaction heat is released which must be removed by some cooling system in order to maintain effective operation.

In general, two types of cooling systems have heretofore been used to remove this excess heat. However, neither system has proven entirely satisfactory.

One system that has been used extensively involves blowing cool air at low pressure under weirs submerged to about six inches below the surface of the slurry. The air bubbles up through the slurry thereby providing the necessary cooling, mainly by evaporating water. Design problems connected with this type of installation have largely been concerned with the necessity of controlling the submergence of the coolers within rather narrow limits, the accumulation of deposits of solids on the submerged weirs thus reducing efficiency, the fact that multiple installations are difficult to balance, therefore requiring a separate fan for each unit, and low efficiency.

In another system the reaction slurry is subjected to a partial vacuum under which vaporization of the water occurs to effect the desired reduction in temperature. However, this system also suffers from some serious design and operating problems such as scale deposition on the vacuum cooler, erosion and corrosion of the cooler, the requirement of fairly larger quantities of cooling water, and the necessity of handling at low pressures substantial quantities of noncondensible gases.

It is therefore a general object of this invention to provide a method and apparatus for cooling solutions and slurries which will overcome the aforesaid difficulties A further object of this invention is to provide a method and apparatus for use in the production of phosphoric acid wherein the exothermic heat generated by the reaction of sulfuric acid on phosphate rock is efficiently removed.

In many chemical industries, such as in the manufacture of phosphoric acid by the aforesaid wet process method, the reaction is accompanied, in addition to the generation of excess heat, by the production of a considerable amount of foam which not only interferes with the cooling system but also creates a series of other problems.

While the cooling systems heretofore generally employed have attempted to control the temperature of the reaction slurry none have attempted to eliminate or even control the foam thus formed.

Accordingly, it is another object of this invention to provide a method and apparatus for cooling a reaction slurry which at the same time will dissipate the foam formed.

These objects and other objects, which will appear as the specification proceeds, are accomplished by the present invention which provides a process and apparatus for simultaneously cooling and defoaming a reaction slurry by continuously blowing cooling gases downwardly onto the surface of said slurry as jets of cooling gas at sufficiently high velocities to create visibly perceptible depressions in the surface of said slurry at least in the region from which the reaction slurry is to be discharged.

Figure 2:
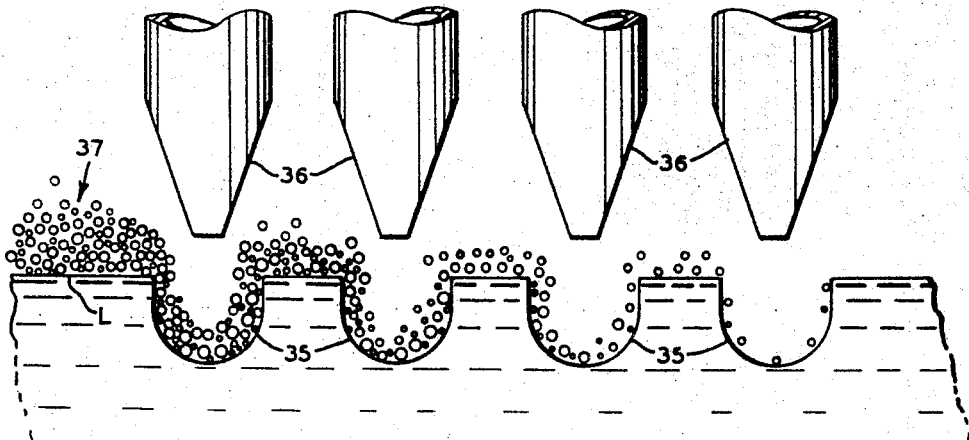

For a clearer understanding of this invention, reference may be had to the following detailed description of a specific embodiment of this invention and the accompanying drawing wherein:

FIGURE 1 is a diagrammatic vertical sectional view of a reaction tank having applied thereto one form of apparatus suitable for carrying out this invention; and FIGURE 2 is an exploded view of the end section of the cooling system shown in FIGURE 1, particularly showing the depressions formed in the slurry surface.

In the drawings there is shown a reaction tank 10 suitable for containing a reaction slurry 11 such for example as obtained when reacting phosphate rock with sulfuric acid. The reaction tank may be of rectangular or circular shape and may be constructed from concrete or steel, preferably lined with rubber. The feed, consisting generally of said phosphate rock and sulfuric acid, enters the tank through a feed pipe indicated generally by reference numeral 12, and is thoroughly mixed by an agitator 13, driven by a conventional drive mechanism 14. While only one such agitator has been shown it is obvious that those skilled in the art will recognize that a series of agitators may be employed, their number and respective location and the reaction vessel being dictated by the specific needs of each installation.

The reaction slurry is maintained at a constant level in the tank, indicated by line L, by an outlet pipe 15 through which the cooled reaction slurry is removed. Other arrangements for controlling the level of the reaction slurry may be employed, for example, overflow weirs or baffle which are well known in the art.

The reaction tank is usually provided with a cover member 16 removably secured in position in any suitable manner such as by bolts 17.

Fumes, which develop during the course of the reaction, for example fluorine fumes, are removed from the tank 10 through an outlet 18, located in said tank cover, which connects via conduit 19 with an exhaust fan 20. The fumes are pumped by said fan via conduit 21 to preferably a wet scrubbing station, not shown, where the fluorine is removed and possibly recovered.

The reaction tank is also provided with cooling means such as a series of nozzles or jets 25 vertically suspended in the tank above the slurry surface from a common manifold or header 26 which is suitably secured to the tank cover 16 such as by bolts 27. These nozzles are mounted so that these lowermost ends are immediately above the slurry surface. In addition, it is preferred that at least some of these nozzles be so mounted as to discharge cooling air onto the surface of the slurry in the region from which the slurry is to be discharged.

Cooling gas, such as air, is supplied to the nozzles by a centrifugal fan 29 which draws air from an outside source, not shown, through conduit 28 and pumps it into the manifold through conduit 30 at a predetermined velocity. Conduit 28 is preferably provided with means such as a damper 31 for regulating the amount of air passing into the fan. From the manifold the cooling gas is discharged through the nozzles onto the slurry.

The manifold 26 is preferably provided with a hinged air tight door 32 through which the interior of the manifold may be inspected and serviced if necessary and through which the nozzles may be periodically cleaned.

As mentioned above, the reaction of phosphate rock with sulfuric acid is an exothermic reaction, the heat of reaction causing the temperature of the slurry to rise to as high as 100° C. In order to maintain an effective operation this temperature must be reduced to about 80° C.

It has been found that an efficient way of removing this excess heat is by blowing a stream of cooling gas downwardly onto the surface of the slurry at such a velocity that the gas issuing from the nozzles form bowl-like depressions 35 (see FIGURE 2) in said slurry surface. However, in order to secure a velocity which will form these depressions without requiring a correspondingly high velocity of the gas pumped through the duct work the lowermost end of the aforesaid nozzle is provided with a tapered reduced end portion 36. With the constricted orifice will increase its velocity sufficiently to form the aforesaid depressions.

Thus, for example, it was found that when a cooling gas was introduced into a nozzle at the rate of forty feet per second, the lower most end of said nozzle being placed about four inches away from the slurry surface and the nozzle having an inside diameter of about eight and three-eighths inches in the untapered portion and about a two inch wide tapered orifice, said gas would issue from the tapered orifice at a rate so that the velocity of the gas at the slurry surface level will be approximately two hundred feet per second. This velocity was sufficient to form a six inch depression in the phosphate slurry.

While the depressions formed in a given solution or slurry will vary not only with the velocity of the cooling gas at the slurry level but also with the density of said slurry, it has been found that for a phosphoric acid reaction slurry depressions of sufficient depth are attained when the velocity of the cooling gas at the normal slurry surface level is from about one hundred feet per second to about three hundred feet per second.

The normal slurry surface level may be defined as the level of the actual slurry surface (excluding foam) when the slurry is in a static condition.

As previously mentioned, the reaction of phosphate rock with sulfuric acid is usually accompanied by the formation of a substantial quantity of foam. However, during cooling in accordance with the aforesaid process, a surprising and unexpected result was observed. It was noticed, contrary to what would be normally expected, that the foam was dissipated by the jets of cooling gas.

One theoretical explanation advanced to explain this phenomenon is that the bubbles of foam formed by the reaction and indicated generally by reference numeral 37 in FIGURE 2 are blown into the depressions 35 formed by the jets of cooling gas issuing from the nozzles. These bubbles once in the depressions are driven into the slurry mass by the impact of the cooling gas. As schematically shown in FIGURE 2, as the blanket of foam progressively flows in and out of each depression, more and more of the foam is dissipated until it is substantially all dispersed.

While it is not intended to be limited to the aforesaid theory, it is believed that this explanation may be useful in explaining why this invention produces this startling effect during the cooling process.

In operation of the specific embodiment heretofore referred to there is provided a single tank type reactor having a slurry volume of just over 51,000 gallons and a designed cooling capacity to dissipate about 96,000 B.t.u. per hour.

Feed to the tank consists of 220 tons per day of phosphate rock, 15.4 gallons per minute of 98% sulfuric acid and 76.5 gallons per minute of recycle liquor comprising an acid fraction of the process. Phosphate slurry is discharged from the tank at the rate of 89 gallons per minute and is usually conveyed to a filter for further processing.

Cooling and defoaming is accomplished by a total of fourteen nozzles arranged in banks and all supplied by one centrifugal fan which pumps cooling air at the rate of 18,000 cubic feet per minute. The dimensions of the nozzles are, as heretofore described, that is, eight and three-eighths inches diameter in the untapered portion, and a two inch wide tapered orifice. The nozzles are placed four inches away from the slurry surface and cooling air is pumped into the nozzle at the rate of forty feet per second. Under these conditions the velocity of the air at the normal slurry surface will be about two hundred feet per second.

While I have disclosed a preferred embodiment it is obvious that suitable modifications to the teachings of this invention may be made without departing from the spirit thereof. For instance, while I have disclosed tapered type nozzles it is obvious that other types of arrangements may be used to accomplish the same results. For example, another suitable arrangement may comprise a conduit provided with a throttle member adjacent the outlet end which will decrease the conduit opening thereby causing the cooling gas to issue at an increased velocity. The throttle member may be an adjustable type so that the velocity of the gas may be increased or decreased as desired. In addition, while the invention has been described in connection with a single tank type of reactor, it is obvious to those skilled in the art that this invention is equally applicable to those reactions conducted in a series of tanks, known as multiple type tank reactors, which are in hydraulic communication with each other.

While the instant invention is presently contemplated as a process of simultaneously cooling and defoaming liquid and slurry masses, it is obvious that this process may be satisfactorily employed as a method of defoaming per se. It is even conceivable that the process of this invention may be employed as a method of simultaneously heating and defoaming a liquid or slurry mass in which the gas issuing from the nozzles is previously heated.

From the foregoing description of an embodiment of this invention, it is evident that the object of this invention, together with many practical advantages, are successfully achieved. While a preferred embodiment of my invention has been described, numerous further modifications may be made without departing from the scope of this invention.

Therefore, it is to be understood that all matters herein set forth or shown in the accompanying drawings are to be interpreted in an illustrative and not in a limiting sense.

I claim:

1. A process for continuously cooling and defoaming phosphoric acid slurry formed by the reaction of acid with phosphate rock and having a layer of foam thereon, which comprises establishing an everchanging body of the slurry to be cooled and defoamed; continuously feeding into said body at a point of introduction the slurry to be cooled and defoamed; continuously discharging a cooled and defoamed slurry from said body at a separate point of discharge while maintaining the surface of said body at a relatively constant level, continuously directing at least one jet of cooling air downwardly onto the surface of said body from an issue point spaced above and separate from said surface in at least one zone extending substantially transversely across the path of flow of slurry between said point of introduction and said point of discharge in such a manner as to form at least one depression in the surface of said body within said zone; and controlling the quantity and velocity of said jet of cooling air in such a manner as to maintain the depth of said depression sufficiently deep for receiving therein foam carried thereto with said slurry, said quantity and velocity of said jet effective to break up the thus received foam within said depression, and furthermore controlling said quantity and velocity in such a manner as to maintain said slurry substantially at a temperature of about 80° C.

2. The process according to claim 1, wherein jets of cooling air are provided respectively in sequential zones extending substantially transversely across the path of flow of the slurry between said point of introduction and said point of discharge, and directed downwardly onto the surface of said body whereby the depressions are formed by said jets.

3. The process according to claim 2, wherein the velocity of the cooling air at the surface of said body is between about 100 and 300 feet per second.

References Cited in the file of this patent
UNITED STATES PATENTS

| | | |
|---|---|---|
| 545,048 | Brunner | Aug. 27, 1895 |
| 1,187,208 | Wahl | June 13, 1916 |
| 1,861,982 | Schiller | June 7, 1932 |
| 2,213,211 | Fleckenstein et al. | Sept. 31, 1940 |